US011885253B1

(12) United States Patent
Raftopoulos et al.

(10) Patent No.: US 11,885,253 B1
(45) Date of Patent: Jan. 30, 2024

(54) CONTROL OF ENGINE ENTHALPY FOR CATALYTIC CONVERTER LIGHT-OFF

(71) Applicant: GM GLOBAL TECHNOLOGY OPERATIONS LLC, Detroit, MI (US)

(72) Inventors: Andrew A. Raftopoulos, Auburn Hills, MI (US); Pratap S. Murthy, Dexter, MI (US); Vijay A. Ramappan, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/987,070

(22) Filed: Nov. 15, 2022

(51) Int. Cl.
*F01N 9/00* (2006.01)
*F01N 3/20* (2006.01)
*F02D 41/02* (2006.01)

(52) U.S. Cl.
CPC ............. *F01N 9/00* (2013.01); *F01N 3/2086* (2013.01); *F01N 2430/00* (2013.01); *F01N 2900/1626* (2013.01); *F02D 41/0255* (2013.01); *F02D 2200/0802* (2013.01)

(58) Field of Classification Search
CPC ...... F01N 9/00; F01N 3/2086; F01N 2430/00; F01N 2900/1626; F02D 41/0255; F02D 2200/0802
See application file for complete search history.

(56) References Cited

U.S. PATENT DOCUMENTS 10,066,561 B2 * 9/2018 Marlett ............... F02D 41/3035

* cited by examiner

*Primary Examiner* — Brandon D Lee
(74) *Attorney, Agent, or Firm* — Quinn IP Law

(57) ABSTRACT

A method of controlling light-off of a catalytic converter in an exhaust system of an internal combustion engine (ICE) includes identifying a start of the ICE requiring a light-off of the catalytic converter. The method also includes regulating an exhaust-flow control valve to increase exhaust gas backpressure in the exhaust system in response to the identified start of the ICE. The method additionally includes regulating combustion inside the ICE to increase enthalpy of the ICE. The method also includes detecting light-off of the catalytic converter. The method additionally includes regulating the exhaust-flow control valve to decrease the exhaust gas backpressure in the exhaust system in response to the catalytic converter light-off. Furthermore, the method includes regulating combustion inside the ICE to decrease ICE enthalpy in response to the catalytic converter light-off. The method may be embodied in an algorithm programmed in an electronic controller of a motor vehicle.

20 Claims, 3 Drawing Sheets

CONTROL OF ENGINE ENTHALPY FOR CATALYTIC CONVERTER LIGHT-OFF

INTRODUCTION

The present disclosure relates to a system and a method for controlling internal combustion engine enthalpy to improve engine catalytic converter light-off performance.

Many modern motor vehicles employ internal combustion engines for propulsion. As a function of the engine's general operation and a by-product of generating power, an internal combustion engine generates a stream of exhaust gas and also gives off heat energy. After a cold-start of the engine, i.e., when the engine is activated with its temperature at or near ambient, the engine proceeds through a "warm-up" period, during which the engine's operating temperature is steadily increased. In thermodynamic terms, temperature of an internal combustion engine's exhaust gas is generally a function of the engine's overall heat content or enthalpy.

During the first couple minutes after starting an internal combustion engine that has been started from cold, an amount of exhaust emissions may be significantly higher than emissions during the engine's steady state operation. In cold engines fuel does not vaporize completely, thus requiring richer air-fuel ratios. Rich air-fuel ratios, in turn, generate higher emissions of hydrocarbons, nitrogen oxides, and carbon monoxide, which diminish only as the engine reaches operating temperature. Cold engines also generate increased emissions because catalytic converters are less efficient under cold conditions and until they reach their operating temperature.

SUMMARY

A method of controlling light-off of a catalytic converter in an exhaust system of an internal combustion engine (ICE) includes identifying, via an electronic controller, a start of the ICE requiring a light-off of the catalytic converter. The method also includes regulating an exhaust-flow control valve, via the electronic controller, to increase exhaust gas backpressure in the exhaust system in response to the identified start of the ICE. The method additionally includes regulating combustion inside the ICE, via the electronic controller, to increase enthalpy of the ICE. The method also includes detecting, via the electronic controller, the light-off of the catalytic converter. The method additionally includes regulating the exhaust-flow control valve, via the electronic controller, to decrease the exhaust gas backpressure in the exhaust system in response to the detected light-off of the catalytic converter. Furthermore, the method includes regulating combustion inside the ICE, via the electronic controller, to decrease enthalpy of the ICE in response to the detected light-off of the catalytic converter.

Regulation of combustion inside the ICE to increase enthalpy of the ICE may be implemented following the regulating of the exhaust-flow control valve to increase exhaust gas backpressure.

Regulation of combustion inside the ICE to each of increase and decrease enthalpy of the ICE may regulate at least one of temperature and mass of exhaust gas flow from the ICE into the exhaust system.

Regulation of at least one of temperature and mass of the flow of exhaust gas from the ICE into the exhaust system may be achieved by regulating at least one of intake and exhaust camshaft timing and spark timing.

Regulation of combustion to increase enthalpy may include at least one of retarding and advancing intake and exhaust camshaft timing via corresponding camshaft phasers and retarding spark timing.

Regulation of combustion to decrease enthalpy may include at least one of advancing and retarding intake and exhaust camshaft timing via corresponding camshaft phasers and advancing spark timing.

The electronic controller may be configured to detect the light-off of the catalytic converter via operative communication with a temperature sensor arranged on the exhaust system proximate the catalytic converter.

Regulation of combustion inside the ICE to decrease enthalpy of the ICE may be implemented following the regulating of the exhaust-flow control valve to decrease the exhaust gas backpressure.

The exhaust gas backpressure may be increased from a baseline first pressure value to a predetermined second pressure value.

The exhaust gas backpressure may be decreased from the predetermined second pressure value to a predetermined third pressure value.

Another embodiment of the disclosure is directed to a vehicle having an electronic controller in operative communication with the ICE and the exhaust-flow control valve. The electronic controller is programmed with an executable algorithm configured to implement the method described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
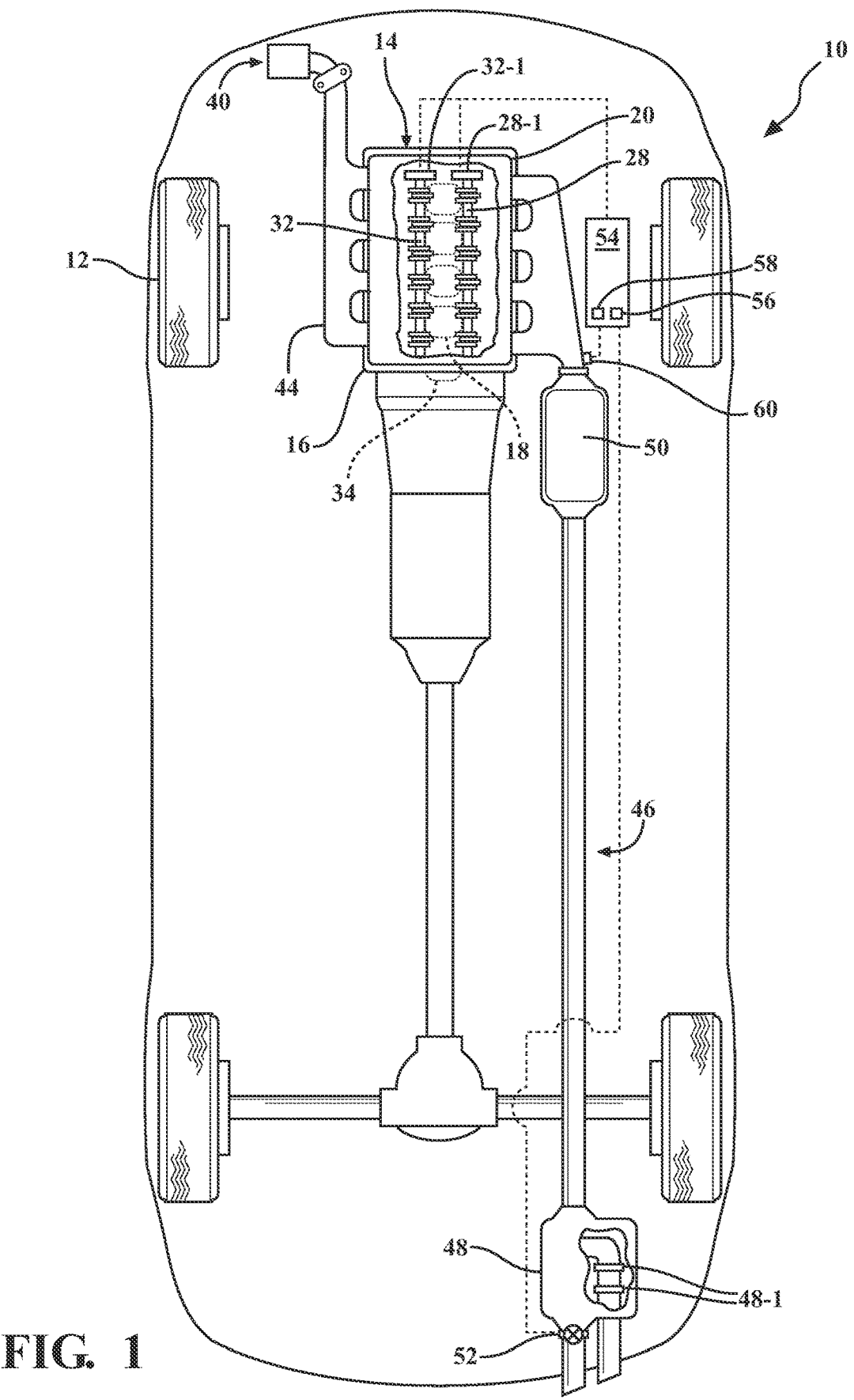
FIG. 1 is a schematic illustration of a vehicle having an internal combustion engine fluidly connected to an exhaust system with a close-coupled catalytic converter, a muffler, and an exhaust-flow control valve, according to the disclosure.
Figure 2:
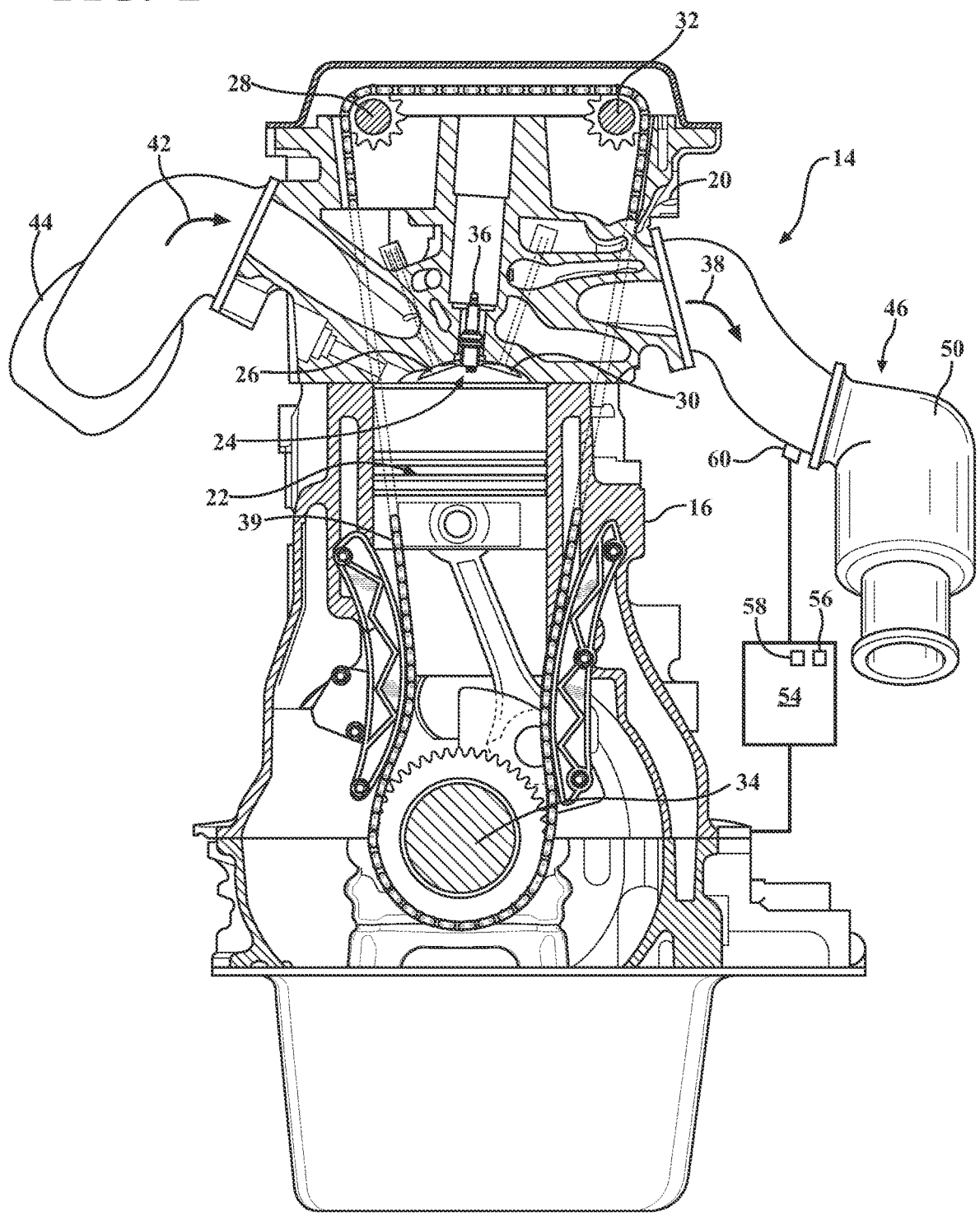
FIG. 2 is a schematic partially cross-sectional close-up front view of the internal combustion engine shown in FIG. 1, depicting intake and exhaust camshaft phasers, according to the disclosure.

Referring to the drawings wherein like reference numbers correspond to like or similar components throughout the several figures, FIG. 1 illustrates a vehicle 10 having a plurality of wheels 12 that may be driven by an internal combustion engine (ICE) 14 that is part of the vehicle powertrain. As shown in FIG. 2, the ICE 14 includes a cylinder block 16 with a plurality of cylinders 18 arranged therein. The ICE 14 also includes a cylinder head 20. Each cylinder 18 includes a piston 22 configured to reciprocate therein. Although the ICE 14 may be either a spark-ignition, i.e., gasoline, engine, or a compression-ignition, i.e., diesel, engine, the present disclosure will focus primarily on a gasoline configuration of the ICE.

With continued reference to FIG. 2, combustion chambers 24 are formed within the cylinders 18 between the bottom surface of the cylinder head 20 and the tops of the pistons 22. The combustion chambers 24 are configured to receive fuel and air such that a fuel-air mixture may form for subsequent combustion therein. As shown in FIG. 2, the ICE 14 also includes a plurality of intake valves 26 operatively connected to the cylinder head 20 and configured to control a supply of air to each cylinder 18 for combustion with fuel therein. An intake camshaft 28 is configured to regulate opening and closing of the respective intake valves 26 during operation of the ICE 14. The ICE 14 additionally includes a plurality of exhaust valves 30 operatively connected to the cylinder head 20 and configured to control removal of post-combustion gasses from each cylinder 18. An exhaust camshaft 32 is configured to regulate opening and closing of the respective exhaust valves 30 during operation of the ICE 14.

The ICE 14 also includes a crankshaft 34 configured to rotate within the cylinder block 16. The crankshaft 34 is rotated by the pistons 22 as a result of increased pressure from the burning of fuel-air mixture in the combustion chambers 24. In the embodiment of the ICE 14 configured as a spark-ignition engine, at least one sparkplug 36 may be arranged inside each combustion chamber 24 to provide ignition of the fuel-air mixture for initiating combustion. After the air-fuel mixture is burned inside a specific combustion chamber 24, the reciprocating motion of a particular piston 22 serves to expend post-combustion exhaust gases 38 from the respective cylinder 18. The intake and exhaust camshafts 28, 32 include respective camshaft phasers 28-1, 32-1 (shown in FIG. 1). Camshaft (or cam) phasers 28-1, 32-1 are configured to adjust timing of the corresponding intake and exhaust camshafts 28, 32 and with that the opening and closing of the intake and exhaust valves 26, 30. The ICE 14 also includes a camshaft-drive element 39, such as a timing belt or a chain (shown in FIG. 2) operatively connecting the intake and exhaust camshafts 28, 32 to the crankshaft 34.

The ICE 14 additionally includes an induction system 40 (shown in FIG. 1) configured to channel an airflow 42 from the ambient to the cylinders 18. As shown, the induction system 40 may include an intake air duct and an intake manifold 44. The intake manifold 44 is configured to distribute the airflow 42 to the cylinders 18 for mixing with an appropriate amount of fuel and subsequent combustion of the resultant fuel-air mixture. After the fuel-air mixture is burned inside the combustion chambers 24, the post-combustion exhaust gases 38 are directed into an exhaust system 46. The exhaust system 46 is configured to channel the exhaust gases 38 from the ICE 14 through one or more exhaust after-treatment devices and thereafter into a sound attenuation device, such as a muffler 48, and then out to the ambient. The exhaust after-treatment device(s) are configured to treat and methodically remove largely carbonaceous particulate byproducts of engine combustion from the post-combustion exhaust gases 38 to reduce emissions of such particulates to the ambient.

As shown in FIG. 1, the above-mentioned exhaust after-treatment devices may include a catalytic converter 50 close-coupled to the ICE 14. Such close-coupling of the catalytic converter 50 is generally intended to expedite warm-up of the respective catalyst and achieve effective reduction of exhaust emissions within a shorter timeframe following a cold-start of the ICE 14. A cold-start of the ICE 14 is generally a condition when engine start occurs after the ICE has remained out of operation for an extended period of time and has cooled off substantially or approximately to the ambient temperature. An indicator of the temperature of the ICE 14 may be a temperature of an engine coolant. The temperature of the engine coolant may be detected directly by a coolant sensor (not shown).

Close coupling of the catalytic converter 50 may also be used to improve combustion stability of the ICE 14 from higher effective cylinder loading. A selectively controllable exhaust-flow control valve 52 is arranged in the exhaust system 46. The exhaust-flow control valve 52 may be configured to bypass a portion 46-1 of the exhaust system 44, which includes a sound attenuation device such as the muffler 48 or a baffle 48-1 mounted in the muffler. A muffler generally includes a fixed combination of orifices and baffles, such as the baffle 48-1, are specifically configured to tune or reduce the level and quality of sound generated by the exhaust gas 38 being emitted by the ICE 14. In general, as emitted by the exhaust system 46, the level and quality of sound generated by the exhaust gas 38 through a fixed combination of baffles and orifices may directly correlate to a variation in exhaust mass flow rate (potentially from different fuel-air mixture firing fractions) and backpressure, which may also affect ICE 14 performance and efficiency. For its part, the exhaust-flow control valve 52, by selectively rerouting and/or restricting and unrestricting exhaust gas flow may be configured to change flow characteristics of the exhaust system 46, vary an exhaust backpressure therein, and measurably affect operating parameters of the ICE 14.

The vehicle 10 also includes an electronic controller 54 in operative communication with the ICE 14 and the exhaust-flow control valve 52. The electronic controller 54 may be programmed to regulate operation of the ICE 14 and the exhaust-flow control valve 52 to control light-off of the catalytic converter 50. The electronic controller 54 may include a central processing unit (CPU) that regulates various functions on the vehicle 10 or be configured as a powertrain control module (PCM) configured to control the vehicle powertrain. In either configuration, the electronic controller 54 includes a processor and tangible, non-transitory memory, which includes instructions for operation of at least the ICE 14 and the exhaust-flow control valve 52 programmed therein.

The memory of the electronic controller 54 may be an appropriate recordable medium that participates in providing computer-readable data or process instructions. Such a recordable medium may take many forms, including but not limited to non-volatile media and volatile media. Non-volatile media for the electronic controller 54 may include, for example, optical or magnetic disks and other persistent memory. Volatile media may include, for example, dynamic random-access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the electronic controller 54 may also include a flexible disk, hard disk, magnetic tape, another magnetic medium, a CD-ROM, DVD, another optical medium, etc.

The electronic controller 54 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 54 or accessible thereby may be stored in the memory and automatically executed to provide the required functionality of the ICE 14 and the exhaust-flow control valve 52. The electronic controller 54 is also configured to monitor the ICE 14 and process data, such as via the subject algorithms, gathered by various powertrain and engine sensors. The electronic controller 54 may be in wireless communication with external device(s), such as a mobile telephone, a laptop, or a personal computer (PC) accessible by an owner or operator of the vehicle 10.

The electronic controller 54 is specifically programmed with an algorithm 56 and configured to execute the algorithm to identify a start 58 of the ICE 14 requiring a light-off of the catalytic converter 50. Such a start 58 may be a cold-start of the ICE, for example from an ambient temperature below a typical operating temperature of the catalyst. The electronic controller 54 is also configured to regulate the exhaust-flow control valve 52 to increase exhaust gas backpressure, such as by restricting a flow of exhaust gas 38, in the exhaust system 46 in response to the identified start of the ICE 14. The exhaust gas backpressure may be increased from a baseline first pressure value $P_1$, which may, for example, be set to facilitate maximum engine fuel efficiency, to a predetermined or preset second pressure value $P_2$, for a predetermined duration of time. Specifically, $P_1$ may be set near atmospheric pressure and P2 may be an increased pressure determined empirically or via a model-based approach. An internal timer of the electronic controller 54 may be used to detect, monitor, and/or control specific duration of the exhaust backpressure increase.

The electronic controller 54 is additionally configured to regulate combustion inside the ICE 14 to increase enthalpy, i.e., thermal energy output, of the ICE. The electronic controller 54 may be programmed to increase enthalpy of the ICE 14 for a preset duration of time or until a predetermined exhaust gas temperature (EGT) is detected signifying a triggered light-off of the catalytic converter 50. The internal timer of the electronic controller 54 may be used to detect, monitor, and/or control specific duration of the enthalpy increase. Generally, enthalpy is a thermodynamic quantity equivalent to the total heat content of a system. Enthalpy is equal to the sum of the system's internal energy and the product of its pressure and volume, i.e., H=E+PV. Typically, while the total enthalpy of a system is not measured, changes in enthalpy may be detected. Accordingly, in practice, a change in enthalpy is the commonly used expression for measurements at constant pressure because it simplifies the description of energy transfer. When transfer of matter into or out of the system is zero and the system does no electrical or mechanical work, at constant pressure the enthalpy change equals the energy exchanged with the environment by heat.

The electronic controller 54 may be configured to increase enthalpy of the ICE 14 following increasing of the exhaust gas backpressure via the regulation of the exhaust-flow control valve 52. The electronic controller 54 may regulate combustion inside the ICE 14 to control temperature and/or mass of exhaust gas 38 flow from the ICE into the exhaust system 46 and initially into the catalytic converter 50. Such regulation of the temperature and/or mass of the flow of exhaust gas 38 from the ICE 14 may be achieved by retarding or advancing intake and/or exhaust camshaft timing and retarding spark timing. In one particular example, the electronic controller 54 may regulate the intake cam phaser 28-1 to advance timing of the intake camshaft 28 and the exhaust cam phaser 32-1 to retard timing of the exhaust camshaft 32 (each from a respective camshaft park position) and/or trigger the sparkplug 36 to generate a combustion initiating spark later in the combustion cycle. The selected variation in the intake and exhaust camshaft timing move may depend on the particular valvetrain design e.g., camshaft park position, and where the maximum enthalpy occurs with respect to the specific engine calibration map.

The electronic controller 54 is also configured to detect the light-off of the catalytic converter 50. The electronic controller 54 may detect the light-off of the catalytic converter 50 via operative communication with a temperature sensor 60 arranged on the exhaust system 46 proximate the catalytic converter 50 and compared versus a target EGT value programmed into the controller. Alternatively, the electronic controller 54 may be programmed to identify a light-off of the catalytic converter 50 having occurred using an empirical model or a correlation table programmed into the controller identifying a duration of time at the increased enthalpy ICE operation with the increased backpressure provided via the exhaust-flow control valve 52. The electronic controller 54 is additionally configured to regulate the exhaust-flow control valve 52 to decrease the exhaust gas backpressure, i.e., derestrict the flow of exhaust gas 38, in the exhaust system 46 in response to the detected light-off of the catalytic converter 50.

The electronic controller 54 is further configured to regulate combustion inside the ICE 14 to decrease enthalpy of the ICE after the detected light-off of the catalytic converter 50. The electronic controller 54 may be configured to regulate combustion inside the ICE 14 to decrease enthalpy of the ICE following the regulation of the exhaust-flow control valve 52 to decrease the exhaust gas backpressure. The electronic controller 54 may be configured to decrease ICE enthalpy by advancing or retarding intake and/or exhaust camshaft timing by regulating the respective intake and exhaust cam phasers 28-1, 32-1 and advancing spark timing by triggering the sparkplug 36 earlier in the combustion cycle. The exhaust gas backpressure is then decreased, via the electronic controller 54 operating the exhaust-flow control valve 52 from the predetermined second value $P_2$ to a predetermined third value $P_3$, which may be higher than the baseline first value $P_1$. Each of the first, second, and third pressure values ($P_1$, $P_2$, and $P_3$) may be programmed into the electronic controller 54. Following the return of the exhaust gas backpressure to the baseline first value $P_1$, the ICE 14 is reset to its previously mapped engine operation. Such previously mapped ICE 14 operation with the third value $P_3$ may be optimized for fuel efficiency or enhanced torque output, depending on, for example, default controller algorithm or operator selected mode.

Figure 3:
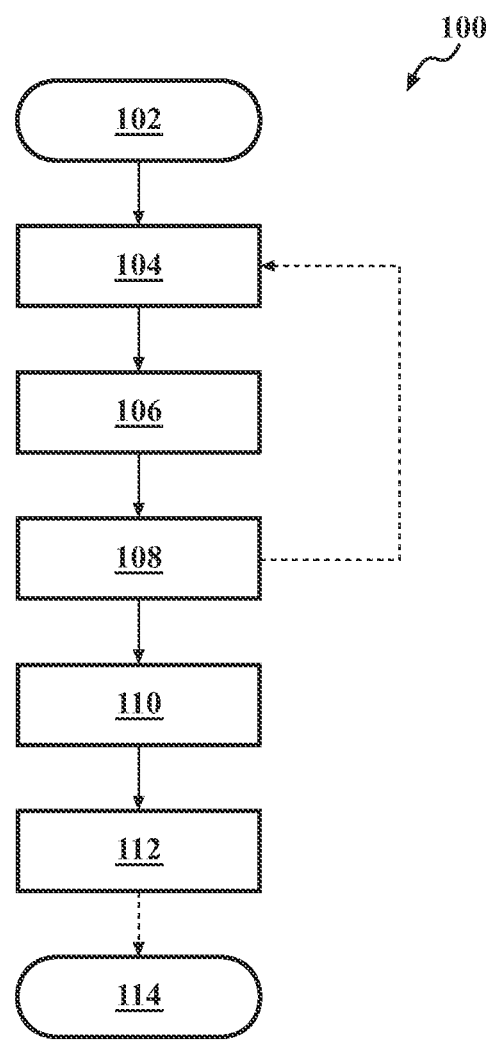
FIG. 3 illustrates, in flow chart format, a method of controlling light-off of the catalytic converter of the internal combustion engine shown in FIGS. 1-2.

FIG. 3 depicts a method 100 of controlling light-off of the catalytic converter 48 in the exhaust system 46 of the ICE 14 via the electronic controller 54, as described above with respect to FIGS. 1-2. The method commences in frame 102 with identifying a start of the ICE 14 requiring a light-off of the catalytic converter 50. The subject start of the ICE 14 may be a cold-start, as described above, and may be identified or detected via an engine coolant temperature sensor. Following the identification of and in response to the start of ICE 14 in frame 102, the method advances to frame 104. In frame 104 the method includes regulating the exhaust-flow control valve 52 to restrict a flow of exhaust gas 38 and increase exhaust gas backpressure in the exhaust system 46. As discussed above, the exhaust gas backpressure may be increased from the baseline first pressure value $P_1$ to a predetermined second pressure value $P_2$. After frame 104, the method moves on to frame 106.

According to the disclosure, in frame 106, the method includes regulating combustion inside the ICE 14 to increase enthalpy of the ICE. As described with respect to FIGS. 1-2, in frame 106, the method may include regulating temperature and/or mass of exhaust gas 38 flow from the ICE 14 into the catalytic converter 50. Specifically, regulating combustion inside the ICE 14 may be achieved by retarding or advancing intake and/or exhaust camshaft timing via the intake cam phaser 28-1 and the exhaust cam phaser 32-1, and retarding spark timing via triggering the sparkplug 36 to generate a spark. The method proceeds to frame 108 after restricting the flow of exhaust gas 38 and increasing enthalpy of the ICE 14. In frame 108, the method includes detecting the light-off of the catalytic converter 50. Detecting the light-off of the catalytic converter 50 may be achieved via the temperature sensor 60. In the event in frame 108 light-off of the catalytic converter 50 has not been detected, the method may loop back from frame 108 to frame 104. Following frame 108, once the light-off of the catalytic converter 50 has been detected, the method advances to frame 110.

In frame 110, the method includes regulating the exhaust-flow control valve 52 to derestrict the flow of exhaust gas 38 and decrease the exhaust gas backpressure in the exhaust system 46 in response to the detected light-off of the catalytic converter 50. Specifically, the exhaust gas backpressure may be decreased from second value $P_2$ to the predetermined third value $P_3$. After frame 110, and in response to the detected light-off of the catalytic converter 50, the method proceeds to frame 112. In frame 112, the method includes regulating combustion inside the ICE 14 to decrease enthalpy of the ICE, thus returning the ICE to baseline operation, for example to optimize fuel efficiency. As described with respect to FIGS. 1-2, decreasing enthalpy of the ICE 14 may be achieved following the regulation of the exhaust-flow control valve 52 by advancing or retarding intake and/or exhaust camshaft timing by regulating the respective intake and exhaust cam phasers 28-1, 32-1 and advancing spark timing by triggering the sparkplug 36 earlier in the combustion cycle.

The method may return to frame 102 following each shut-down of the ICE 14 or conclude in frame 114 with the ICE 14 operating according to predetermined baseline parameters. Overall, the method 100 is intended to accelerate light-off of the catalytic converter 48 and thus enhance exhaust emission performance of the ICE 14. As described herein, the method 100 employs a specifically programmed engine controller operating existing powertrain components, such as intake and exhaust cam phasers and an exhaust-flow control valve, to selectively regulate operation and heat generation of the engine during initial engine start to affect catalytic converter light-off. Additionally, the described method permits an improvement in light-off performance of a close-coupled catalytic converter by regulating the engine in a way that is largely transparent to the operator of the host vehicle.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling light-off of a catalytic converter in an exhaust system of an internal combustion engine (ICE), the method comprising:
   identifying, via an electronic controller, a start of the ICE requiring a light-off of the catalytic converter;
   regulating an exhaust-flow control valve, via the electronic controller, to increase exhaust gas backpressure in the exhaust system in response to the identified start of the ICE;
   regulating combustion inside the ICE, via the electronic controller, to increase enthalpy of the ICE;
   detecting, via the electronic controller, the light-off of the catalytic converter;
   regulating the exhaust-flow control valve, via the electronic controller, to decrease the exhaust gas backpressure in the exhaust system in response to the detected light-off of the catalytic converter; and
   regulating combustion inside the ICE, via the electronic controller, to decrease enthalpy of the ICE in response to the detected light-off of the catalytic converter.

2. The method of claim 1, wherein regulating combustion inside the ICE to increase enthalpy of the ICE is implemented following the regulating of the exhaust-flow control valve to increase exhaust gas backpressure.

3. The method of claim 1, wherein regulating combustion inside the ICE to each of increase and decrease enthalpy of the ICE regulates at least one of temperature and mass of exhaust gas flow from the ICE into the exhaust system.

4. The method of claim 3, wherein regulating at least one of temperature and mass of the flow of exhaust gas from the ICE into the exhaust system is achieved by regulating at least one of intake and exhaust camshaft timing and spark timing.

5. The method of claim 4, wherein regulating combustion to increase enthalpy includes at least one of retarding and advancing intake and exhaust camshaft timing via corresponding camshaft phasers and retarding spark timing.

6. The method of claim 4, wherein regulating combustion to decrease enthalpy includes at least one of advancing and retarding intake and exhaust camshaft timing via corresponding camshaft phasers and advancing spark timing.

7. The method of claim 1, wherein detecting the light-off of the catalytic converter is achieved via a temperature sensor arranged on the exhaust system proximate the catalytic converter and in operative communication with the electronic controller.

8. The method of claim 1, wherein regulating combustion inside the ICE to decrease enthalpy of the ICE is implemented following the regulating of the exhaust-flow control valve to decrease the exhaust gas backpressure.

9. The method of claim 1, wherein the exhaust gas backpressure is increased from a baseline first pressure value to a predetermined second pressure value.

10. The method of claim 9, wherein the exhaust gas backpressure is decreased from the predetermined second pressure value to a predetermined third pressure value.

11. A motor vehicle comprising:
    an internal combustion engine (ICE);
    an exhaust system fluidly connected to the ICE and having a catalytic converter configured to treat exhaust gas from the ICE;
    an exhaust-flow control valve arranged in the exhaust system; and an electronic controller in operative communication with the ICE and the exhaust-flow control valve, programmed with an algorithm, and configured to execute the algorithm to:

identify a start of the ICE requiring a light-off of the catalytic converter;

regulate an exhaust-flow control valve to increase exhaust gas backpressure in the exhaust system in response to the identified start of the ICE;

regulate combustion inside the ICE to increase enthalpy of the ICE;

detect the light-off of the catalytic converter;

regulate the exhaust-flow control valve to decrease the exhaust gas backpressure in the exhaust system in response to the detected light-off of the catalytic converter; and regulate combustion inside the ICE to decrease enthalpy of the ICE in response to the detected light-off of the catalytic converter.

12. The motor vehicle of claim 11, wherein the electronic controller is configured to regulate combustion inside the ICE to increase enthalpy of the ICE following the regulation of the exhaust-flow control valve to increase exhaust gas backpressure.

13. The motor vehicle of claim 11, wherein the electronic controller is configured to regulate combustion inside the ICE to each of increase and decrease enthalpy of the ICE regulates at least one of temperature and mass of exhaust gas flow from the ICE into the exhaust system.

14. The motor vehicle of claim 13, wherein the electronic controller is configured to regulate at least one of temperature and mass of the flow of exhaust gas from the ICE into the exhaust system by regulating at least one of intake and exhaust camshaft timing and spark timing.

15. The motor vehicle of claim 14, wherein the electronic controller is configured to regulate combustion to increase enthalpy by at least one of retarding and advancing intake and exhaust camshaft timing via corresponding camshaft phasers and retarding spark timing.

16. The motor vehicle of claim 14, wherein the electronic controller is configured to regulate combustion to decrease enthalpy by at least one of advancing and retarding intake and exhaust camshaft timing via corresponding camshaft phasers and advancing spark timing.

17. The motor vehicle of claim 11, wherein the electronic controller is configured to detect the light-off of the catalytic converter via operative communication with a temperature sensor arranged on the exhaust system proximate the catalytic converter.

18. The motor vehicle of claim 11, wherein the electronic controller is configured to regulate combustion inside the ICE to decrease enthalpy of the ICE following the regulation of the exhaust-flow control valve to decrease the exhaust gas backpressure.

19. The motor vehicle of claim 11, wherein the exhaust gas backpressure is increased from a baseline first pressure value to a predetermined second pressure value, and wherein the exhaust gas backpressure is decreased from the predetermined second pressure value to a predetermined third pressure value.

20. A method of controlling light-off of a catalytic converter in an exhaust system of an internal combustion engine (ICE), the method comprising:

identifying, via an electronic controller, a start of the ICE requiring a light-off of the catalytic converter;

regulating an exhaust-flow control valve, via the electronic controller, to increase exhaust gas backpressure in the exhaust system in response to the identified start of the ICE;

regulating combustion inside the ICE, via the electronic controller, to increase enthalpy of the ICE following the regulating of the exhaust-flow control valve to increase exhaust gas backpressure regulates at least one of temperature and mass of exhaust gas flow from the ICE into the exhaust system;

detecting, via the electronic controller, the light-off of the catalytic converter;

regulating the exhaust-flow control valve, via the electronic controller, to decrease the exhaust gas backpressure in the exhaust system in response to the detected light-off of the catalytic converter; and regulating combustion inside the ICE, via the electronic controller, to decrease enthalpy of the ICE in response to the detected light-off of the catalytic converter following the regulating of the exhaust-flow control valve to decrease the exhaust gas backpressure regulates at least one of temperature and mass of exhaust gas flow from the ICE into the exhaust system.

* * * * *